United States Patent Office 2,842,520
Patented July 8, 1958

2,842,520

VINYL CONTAINING SILICONE ELASTOMERS COMPRISING SULFUR COMPOUNDS AS CURING AGENTS

Keith E. Polmanteer and Robert J. Koch, Midland, Mich., assignors to Dow Corning Corporation, Midland, Mich., a corporation of Michigan No Drawing. Application August 19, 1954
Serial No. 451,038

10 Claims. (Cl. 260—46.5)

This invention relates to vulcanization of alkenyl siloxanes with certain organic sulfur compounds.

In the copending application of Chester C. Currie filed concurrently herewith it is disclosed and claimed that alkenyl siloxanes can be vulcanized with sulfur and with combinations of sulfur and certain nitrogen and/or sulfur containing organic compounds. The applicants have found unexpectedly that vulcanization of alkenyl siloxanes can also be obtained in the absence of sulfur with certain organo sulfur compounds hereinafter defined.

Although many methods have been suggested for vulcanization of organopolysiloxanes, to date only three have met with any commercial success. These are curing of the siloxane with certain organic peroxides, vulcanization of silicate containing organopolysiloxanes with metallic catalysts and vulcanization of hydrogen containing siloxanes with metallic catalysts. All of these methods have proven satisfactory for many applications but they all suffer from certain disadvantages. Of the three methods the peroxide cure has met with the widest commercial application. But this method also produces rubbers having the lowest stress-strain properties. Furthermore peroxide cured siloxanes tend to deteriorate upon subsequent heat aging due undoubtedly to residual vulcanizability remaining in the material.

The silicate and hydrogen containing siloxanes when cured often give physical properties superior to the peroxide cured materials. However, the latter two methods suffer from the disadvantage that the cure proceeds spontaneously when the catalyst is added to the system. Whereas this is advantageous under certain circumstances it is disadvantageous in others. Consequently, these methods of curing have more limited applicability than the peroxide cure. It would be highly advantageous to provide a method of vulcanizing siloxanes which can be controlled at will and which will give superior properties to that obtained with peroxides.

It is the object of this invention to provide a novel method for curing organopolysiloxanes. Another object is to provide a new method of curing organopolysiloxane elastomers which give superior products. Another object is to provide a new method of curing organopolysiloxane resins which avoids hydroxyl condensation thereby eliminating bubbling caused by escaping water vapor. Other objects and advantages will be apparent from the following description.

In accordance with this invention a vinyl siloxane is cured by heating it with at least .5% by weight based on the weight of the siloxane of a compound of the group thiuram monosulfides, thiuram disulfides, thiuram tetrasulfides, salts of dithiocarbamates, xanthates, xanthogen disulfides, and benzothiazyl derivatives of the formula

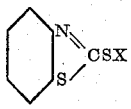

in which X is of the group hydrogen, metals and the radical

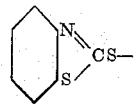

Siloxanes which are operative in this invention are those which contain at least .01 mol percent vinyl siloxane (i. e., a siloxane having at least 1 vinyl radical attached to the silicon atoms). The remaining organic radicals in said siloxane, if any, can be any saturated aliphatic hydrocarbon radical, any aryl hydrocarbon radical or any halogenated monovalent hydrocarbon radical. The ratio of the total number of organic radicals to silicon atoms in the siloxanes of this invention ranges on the average from 1 to 3. It should be understood that the siloxanes operative herein can be composed of siloxane units having 1, 2 or 3 of the above organic radicals attached to the silicon atoms by Si—C linkages. The siloxane can contain a mixture of any combination of the monoorgano, diorgano and triorgano siloxane units.

The siloxanes employed herein can be those in which all the organic groups are alkenyl radicals. Specific examples of such siloxanes are monovinylsiloxane, diallylsiloxane, triallylsiloxane, monooctadecenylsiloxane, vinylhexenylsiloxane and copolymers of any of these. In addition the siloxanes employed in this invention can be of the type RR'SiO, RR'$_2$SiO$_{.5}$, and R$_2$R'SiO$_{.5}$ in which R is any alkenyl radical and R' is any saturated aliphatic hydrocarbon radical, aryl hydrocarbon radical or halogenated monovalent hydrocarbon radical. Likewise siloxanes operative herein can be copolymers of alkenyl containing siloxanes and saturated aliphatic hydrocarbon substituted siloxanes, aryl hydrocarbon substituted siloxanes and halogenated monovalent hydrocarbon substituted siloxanes in any combination provided there is at least .01 mol percent alkenyl siloxanes in the copolymer. Specific examples of such copolymers are vinylethylsiloxane and phenylmethylsiloxane; monovinylsiloxane, monomethylsiloxane and diphenylsiloxane; allylmethylsiloxane and trimethylsiloxane; trifluorotolylmethylsiloxane, monophenylsiloxane and methylvinylsiloxane; monooctadecenylsiloxane, cyclohexylmethylsiloxane and trifluorovinylmethylsiloxane; xenylmethylsiloxane, chlorophenylmethylsiloxane and chloromethylvinylmethylsiloxane; and benzylmethylsiloxane, monotolylsiloxane and allyloctadecylsiloxane. The siloxanes employed herein can also contain limited amounts of SiO$_2$ units.

The compositions of this invention which contain above 5 mol percent alkenyl siloxane and those in which the average number of organic radicals to silicon is below 1.9 in general form resinous products when cured. The materials of this invention in which the amount of alkenylsiloxane ranges from .01 to 5 mol percent and in which the average number of organic radicals to silicon is above 1.9 will in general form elastomeric products when cured. The best elastomers are prepared employing copolymers in which essentially all of the siloxane units are of the formula RR'SiO and R''$_2$SiO in which R is an alkenyl radical, preferably vinyl, and R' and R'' are methyl, phenyl or fluorinated hydrocarbon radicals. In such elastomers it is preferred that the mol percent of alkenyl siloxane be from .1 to 5. These preferred elastomers may contain traces of monoorgano and triorgano siloxane units.

The physical state of the siloxanes employed herein is not critical. They can range from thin fluids to non-flowing solids.

Specific examples of vulcanizing agents which can be employed either singly or in combination in the process of this invention are benzothiazyl derivatives of the formula

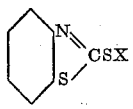

in which X is hydrogen, a metal or the radical

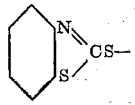

such as for example 2-mercaptobenzothiazole, 2,2'-benzothiazyldisulfide, and zinc benzothiazyl sulfide; thiuram monosulfides such as tetraalkylthiurammonosulfides such as tetramethylthiurammonosulfide, tetraoctadecylthiurammonosulfide, and cycloalkylenethiurammonosulfides such as di-N-pentamethylenethiurammonosulfide; thiuram disulfides such as tetraalkylthiuramdisulfides such as tetramethylthiuramdisulfide, and tetraoctadecylthiuram disulfide, and cycloalkylenethiuramdisulfides such as di-N-pentamethylenethiuramdisulfide; thiuram tetrasulfides such as tetraalkylthiuramtetrasulfides such as tetramethylthiuramtetrasulfide and tetrabutylthiuramtetrasulfide and cycloalkylenethiuramtetrasulfides such as di-N-pentamethylenethiuramtetrasulfide; salts of dithiocarbamic acids such as piperidinium-N-pentamethylenedithiocarbamate and metal salts of the formula

where Y is, for example, methyl, ethyl, butyl, benzyl and phenyl, M is, for example, zinc, lead, copper, bismuth, selenium and tellurium and $x$ is an integer equal to the valence of the metal; xanthates such as zinc butylxanthate, lead ethylxanthate, and copper methylxanthate; and xanthogen disulfides such as butylxanthogendisulfide, diethylxanthogendisulfide and dimethylxanthogendisulfide.

The amount of vulcanizing agent employed should be at least .5% by weight based on the weight of the siloxane. The upper limit of the amount of vulcanizing agent is not critical although, in general, amounts less than 10% by weight are employed. In those cases where a combination of two or more of the above vulcanizing agents are used the total weight of the compounds should be at least .5% based on the weight of the siloxane.

The compositions of this invention are vulcanized by heating a mixture of the siloxane and organosulfur compound at a temperature sufficiently high to cause curing of the siloxane to the desired state. In general, the temperature employed will be between 50 and 300° C. The vulcanization procedure can be carried out at atmospheric pressure or in a press. The presence or absence of air is immaterial. Consequently, the process of this invention is freed from some of the limitations which are found in the peroxide cures.

If desired, fillers may be incorporated in the compositions of this invention in order to impart increased strengths. Any of the fillers commonly employed with organosilicon resins and rubbers can be used herein. Typical fillers include metal oxides such as titania, zinc oxide, magnesium oxide, ferric oxide, chromic oxide, siliceous materials such as glass fibers, diatomaceous earth, silica aerogels, fume silicas, crushed quartz and silica xerogels; carbon black; and organic fillers such as wood flour, cotton linters, cork and the like.

If desired, the fillers employed in this invention especially the silica fillers can be treated with organochlorosilanes or other organosilicon compounds by any of the methods known in the art.

The process and products of this invention are useful as resinous materials and elastomers in the fabrication of electrical-insulated gaskets, conduits and for other uses for which organosilicon resins and elastomers are normally employed.

The term "consisting essentially of" as employed in the specification and claims means that the essential ingredients of the compositions are the defined polymers and vulcanizing agents but the term does not exclude the presence of fillers, compression set additives, oxidation inhibitors, pigments, activators such as metallic selenium, zinc oxide, fatty acids, litharge and magnesium oxide and other additives which are normally employed in resins and elastomers.

The following examples are illustrative only and should not be construed as limiting the invention which is properly defined in the appended claims.

*Example 1*

100 parts by weight of a copolymer gum having the composition 4 mol percent vinylmethylsiloxane and 96 mol percent dimethylsiloxane, 40 parts by weight of a fume silica, 5 parts by weight of selenium diethyldithiocarbamate and 1.5 parts by weight of mercaptobenzothiazole were milled until a uniform mix was obtained and then heated in a press 20 minutes at 160° C. and thereafter cured in an oven 24 hours at 150° C. The resulting elastomer had a durometer of 55, a tensile strength of 1120 p. s. i. and an elongation at break of 460%.

*Example 2*

100 parts by weight of a copolymer gum composed of 96 mol percent dimethylsiloxane and 4 mol percent methylvinylsiloxane, 40 parts by weight of a fume silica and 2 parts by weight of tetramethylthiuramdisulfide were milled and heated 24 hours at 200° C. The resulting elastomer had a durometer of 55, a tensile strength of 948 p. s. i. and an elongation at break of 480%.

*Example 3*

The procedure of Example 2 was repeated except that 1 part by weight selenium diethyldithiocarbamate was used as the vulcanizing agent. The resulting elastomer had a durometer of 52, a tensile strength of 815 p. s. i. and an elongation at break of 625%.

*Example 4*

Equivalent results are obtained when a copolymer of .33 mol percent phenylvinylsiloxane, 5 mol percent diphenylsiloxane and 64.67 mol percent dimethylsiloxane is employed in the method of Example 2.

*Example 5*

A resinous product is obtained when allylmethylsiloxane is cured by heating it with 5 parts by weight based on the weight of the siloxane of tetramethylthiuramdisulfide at a temperature of 200° C. for 5 hours under 200 p. s. i. pressure.

*Example 6*

Vulcanization to an elastomer takes place when 100 parts by weight of a 10,000 cs. fluid copolymer having the composition 1 mol percent methylvinylsiloxane and 99 mol percent dimethylsiloxane is milled with 100 parts by weight $TiO_2$ and 5 parts by weight of any one of the compounds listed below and then heated 24 hours at 150° C.:

2,2'-benzothiazyl disulfide,
Zinc benzothiazyl sulfide,
Tetramethylthiurammonosulfide,
Di-N-pentamethylene thiuramtetrasulfide,
Piperidinium-N-pentamethylenedithiocarbamate,
Zinc dibenzyldithiocarbamate,
Bismuth dimethyldithiocarbamate,
Lead dimethyldithiocarbamate,
Tellurium diethyldithiocarbamate,
Zinc dibutyldithiocarbamate,
Zinc butyl xanthate, and
Dibutyl xanthogen disulfide.

That which is claimed is:

1. A composition of matter, which when cured produces an elastomer, consisting essentially of (1) an organopolysiloxane containing from .1 to 5 mol percent siloxane units of the formula R'ViSiO, essentially all of the remaining siloxane units being of the formula R"$_2$SiO in which siloxane Vi is a vinyl radical and R' and R" are selected from the group consisting of saturated aliphatic hydrocarbon radicals, aryl hydrocarbon radicals and halogenated monovalent hydrocarbon radicals and (2) as the sole curing agent at least .5% by weight based on the weight of the siloxane of a compound selected from the group consisting of thiuram monosulfides, thiuram disulfides, thiuram tetrasulfides, salts of dithiocarbamates, xanthates, xanthogen disulfides and compounds of the formula

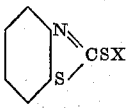

where X is selected from the group consisting of hydrogen, metals and the radical

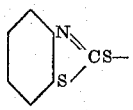

2. A composition of matter, in which when cured produces an elastomer, consisting essentially of (1) an organopolysiloxane containing from .1 to 5 mol percent siloxane units of the formula R'ViSiO, essentially all of the remaining siloxane units being of the formula R"$_2$SiO in which siloxane Vi is a vinyl radical and R' and R" are selected from the group consisting of saturated aliphatic hydrocarbon radicals, aryl hydrocarbon radicals and halogenated monovalent hydrocarbon radicals, (2) as the sole curing agent at least .5% by weight based on the weight of the siloxane of a compound selected from the group consisting of thiuram monosulfides, thiuram disulfides, thiuram tetrasulfides, salts of dithiocarbamates, xanthates, xanthogen disulfides and compounds of the formula

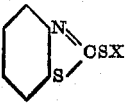

where X is selected from the group consisting of hydrogen, metals and the radical

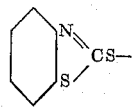

and (3) a filler.

3. A composition of matter in accordance with claim 1 in which R' and R" are methyl.
4. A composition in accordance with claim 1 in which R' is methyl and R$_2$"SiO is a methyl phenyl siloxane.
5. A composition in accordance with claim 1 in which R' is phenyl and R"$_2$SiO is dimethyl siloxane.
6. A composition in accordance with claim 1 in which R' is phenyl and R"$_2$SiO is a methyl phenyl siloxane.
7. A composition of matter in accordance with claim 5 in which R' and R" are methyl.
8. A composition in accordance with claim 2 in which R' is methyl and R$_2$"SiO is a methyl phenyl siloxane.
9. A composition in accordance with claim 2 in which R' is phenyl and R$_2$"SiO is dimethyl siloxane.
10. A composition in accordance with claim 2 in which R' is phenyl and R$_2$"SiO is a methyl phenyl siloxane.

References Cited in the file of this patent

UNITED STATES PATENTS

| | | |
|---|---|---|
| 2,521,528 | Marsden | Sept. 5, 1950 |
| 2,557,928 | Atkinson | June 26, 1951 |
| 2,713,564 | Pfeifer et al. | July 19, 1955 |

OTHER REFERENCES

Barron: Modern Rubber Chemistry, Van Nostrand, 1948, pp. 196, 197, 198, 199, 214, 215, and 217.

Hurd: Journal American Chemistry Society, vol. 67, 1945, pp. 1813–1814.

Hurd et al.: Inc. & Eng. Chem, vol. 40, 1948, pp. 2078–2081.

UNITED STATES PATENT OFFICE
CERTIFICATE OF CORRECTION

Patent No. 2,842,520            July 8, 1958

Keith E. Polmanteer et al.

It is hereby certified that error appears in the printed specification of the above numbered patent requiring correction and that the said Letters Patent should read as corrected below.

Column 2, line 27, for "monoactadecenylsiloxane" read --monooctadecenylsiloxane--; column 6, line 22, for the claim reference numeral "5" read --2--.

Signed and sealed this 7th day of October 1958.

(SEAL)
Attest:

KARL H. AXLINE            ROBERT C. WATSON
Attesting Officer            Commissioner of Patents